United States Patent [19]

Langford

[11] Patent Number: 4,539,006

[45] Date of Patent: Sep. 3, 1985

[54] LEATHER TREATMENT

[75] Inventor: Nathaniel P. Langford, Somerset Township, St. Croix County, Wis.

[73] Assignee: Minnesota Mining and Manufacturing Company, St. Paul, Minn.

[21] Appl. No.: 634,829

[22] Filed: Aug. 1, 1984

Related U.S. Application Data

[63] Continuation-in-part of Ser. No. 531,932, Sep. 13, 1983.

[51] Int. Cl.$^3$ .................................... C08K 5/16

[52] U.S. Cl. .................................... 8/94.1 R; 8/94.22; 8/94.23; 252/8.57; 252/8.6; 252/8.8; 252/8.75; 427/389

[58] Field of Search .................... 252/8.57, 8.8, 8.6, 252/8.75; 8/94.1 R, 94.22, 94.23; 427/389

[56] References Cited

U.S. PATENT DOCUMENTS

| | | | |
|---|---|---|---|
| 2,803,615 | 8/1957 | Ahlbrecht et al. | 260/29.6 |
| 2,841,573 | 7/1968 | Ahlbrecht et al. | 260/79.3 |
| 3,255,131 | 6/1966 | Ahlbrecht et al. | 260/22 |
| 3,282,905 | 11/1966 | Fasick et al. | 252/8.6 |
| 3,445,491 | 5/1969 | Pacini | 260/399 |
| 3,471,518 | 10/1969 | Hager | 260/345.9 |
| 3,498,958 | 6/1968 | Ray-Chaudhuri et al. | 260/78.5 |
| 3,524,760 | 8/1970 | Pinkerton | 117/63 |
| 3,544,663 | 12/1970 | Hauptschein et al. | 525/200 |
| 3,621,059 | 11/1971 | Bartlett | 260/561 HL |
| 3,651,105 | 3/1972 | Anello et al. | 260/414 |
| 3,657,320 | 4/1972 | Anello et al. | 260/471 |
| 3,660,360 | 5/1972 | Ray-Chaudhuri et al. | 260/78.5 |
| 3,681,413 | 8/1972 | Sweeney et al. | 260/404.5 |
| 3,920,389 | 11/1975 | Eanzel | 252/8.6 |
| 3,987,227 | 10/1976 | Schultz et al. | 428/91 |
| 4,035,506 | 7/1977 | Lucas et al. | 424/303 |
| 4,295,976 | 10/1981 | Dessaint et al. | 252/8.9 |
| 4,302,366 | 11/1981 | Perronin et al. | 252/8.57 |
| 4,382,798 | 5/1983 | Suzuki et al. | 252/8.6 |

FOREIGN PATENT DOCUMENTS

| | | |
|---|---|---|
| 0107948 | 5/1984 | European Pat. Off. . |
| 1418985 | 10/1969 | Fed. Rep. of Germany . |
| 2034155 | 1/1971 | Fed. Rep. of Germany . |
| 2033043 | 11/1970 | France . |
| 2106269 | 4/1972 | France . |
| 2279381 | 2/1976 | France . |
| 1020509 | 2/1966 | United Kingdom . |

OTHER PUBLICATIONS

Oleophobic and Hydrophobic Properties of Fluoro Compounds and Their Application in Leather Making, T. Nagabhushanam, K. J. Kedlaya, D. Ramaswamy & M. Santappa, "Leather Science", vol. 22, 1975, pp. 229-254.

*Primary Examiner*—Paul Lieberman
*Assistant Examiner*—John F. McNally
*Attorney, Agent, or Firm*—Donald M. Sell; James A. Smith; David L. Weinstein

[57] ABSTRACT

Composition useful for treating leather, textiles, and cellulosic materials to impart a high degree of water and oil repellancy thereto. The composition contains a fluorochemical compound having (a) a fluoroaliphatic moiety, (b) an aliphatic moiety, and (c) an organic group which connects moiety (a) and moiety (b).

14 Claims, No Drawings

LEATHER TREATMENT

This application is a continuation-in-part of U.S. Ser. No. 531,932 filed Sept. 13, 1983.

BACKGROUND OF THE DISCLOSURE

This invention, in one aspect, relates to a composition comprising a fluorochemical compound useful for treating leather, textiles, and cellulosic materials. In another aspect, the invention relates to a method for treating these materials with the composition. In a third aspect, this invention relates to leather, textiles and cellulosic materials treated with the composition.

Leather has a combination of properties which has long made it useful and desirable for many applications, e.g. footwear, garments, and upholstery, requiring protection, comfort, durability, and esthetics. Such properties include long term flexibility, toughness, breathability, insulation, conformability, soft feel, and luxurious appearance. However, due to its porous, fibrous structure, leather absorbs water and oil, and the consequent unsightly spotting and stains detract from its usefulness and appearance. There has been considerable effort expended to overcome these drawbacks of leather. See Kirk-Othmer, Encycl. of Chem. Tech., Vol. 22, 1970, John Wiley & Sons, p. 150, 151.

Leather has been frequently treated with various substances to impart greater water and oil repellancy. Because the desired result of such treatment may vary depending upon the user's expectation, it is much more practical for the ultimate consumer to apply the treating product rather than the manufacturer.

At present, products that are used by consumers to impart water and oil repellancy to leather include waxes, e.g, beeswax, carnauba wax, paraffin wax; greases, e.g., lanolin; oils, e.g., fish oil, mink oil, neat's-foot oil, silicones, e.g., dimethylpolysiloxane, silicone resins; and fluorochemicals, e.g., FC-326 Scotchgard® Brand Fabric Protector available from Minnesota Mining and Manufacturing Company, and FC-905 3M Brand Fluorochemical available from Minnesota Mining and Manufacturing Company.

The waxes, greases, oils, and silicones have been found to impart some degree of water and oil repellancy to leather; however, none of these are as effective as fluorochemicals in providing water and oil repellancy. Fluorochemicals, however, are somewhat less desirable to use than are waxes or oils, generally because certain of the solvents needed to apply fluorochemicals to leather are deleterious to leather or dyes that have been applied to the leather. Furthermore, unlike waxes or oils, presently available fluorochemical compounds are not known to condition or clean leather.

Although there are many commercially available fluorochemicals which will impart water and oil repellancy to textiles, they are generally applied from solutions wherein the solvent is a chlorinated hydrocarbon, e.g., trichloroethane. Many consumers find chlorinated hydrocarbons objectionable for both health and environmental reasons.

SUMMARY OF THE INVENTION

This invention involves a composition comprising a fluorochemical compound for treating leather, textiles, and cellulosic materials. The invention further involves a method of treating these materials with the composition. The invention also involves leather, textiles, and cellulosic materials treated with the composition.

The fluorochemical compounds useful in this invention confer durable water and oil repellancy to leather while not adversely affecting the appearance, feel, hand, and other desirable qualities of the leather. The fluorochemical compounds useful in the practice of this invention are capable of providing up to about 30 times as much water repellancy to leather as the best commercially available leather treatment products. The fluorochemical compounds are also useful for imparting water and oil repellancy to textiles, including both natural materials, e.g. cotton, silk, and synthetic materials, e.g. nylon, polyester. In addition the fluorochemical compounds have been found to be useful for imparting water and oil repellancy to cellulosic materials, e.g. wood, paper.

The preferred fluorochemical compounds useful in providing the claimed composition contain one or more sites of unsaturation, which allows crosslinking after they are applied to the surface of the leather. The solvents from which these fluorochemical compounds can be applied are not only not harmful to leather, but they are also capable of cleaning and conditioning the leather. In addition, the solvents perform the additional function of suppressing cross-linking of the fluorochemical compounds before the composition is applied to the leather. Upon evaporation of the solvent after application of the composition, the fluorochemical compound cross-links to cure in air at normal room temperature.

The fluorochemical compounds of this invention can be applied from solvents that are not harmful to the health of the consumer, to leather itself, to dyes previously applied to leather, or to textiles and cellulosic materials. While not preferred, the fluorochemical compounds can also be applied from chlorinated hydrocarbon solvents. Compositions of the present invention can be readily formulated into a variety of preparations for various modes of application to leather and/or textiles and/or cellulosic materials.

Useful fluorochemical compounds contain (a) a fluoroaliphatic moiety,
(b) an aliphatic moiety, and
(c) an organic group which connects moiety (a) and moiety (b).

Fluorochemical compounds useful in the practice of this invention are preferably represented by the following general formula:

$$R_f\text{—}Q\text{—}A$$

wherein $R_f$ represents the fluoroaliphatic moiety (a),
A represents the aliphatic moiety (b), and
Q represents the organic group which connects moiety (a) and moiety (b).

DETAILED DESCRIPTION

The fluoroaliphatic moiety ($R_f$) is a fluorinated, preferably saturated, monovalent, non-aromatic, aliphatic radical of at least three fully fluorinated connected carbon atoms in a chain. The chain in the radical may be straight, branched, or, if sufficiently large, cyclic, and may be interrupted by divalent oxygen atoms or trivalent nitrogen atoms bonded only to carbon atoms. A fully fluorinated aliphatic radical is preferred, but hydrogen or chlorine atoms may be present as substituents in the radical provided that not more than one atom of either is present in the radical for every two carbon atoms, and the radical must at least contain a terminal perfluoromethyl group. Preferably, the fluorinated aliphatic radical contains not more than 20 carbon atoms because such a large radical results in inefficient use of the fluorine content. The fluorochemicals useful in this invention preferably contain at least 20 weight percent, preferably 25 to 50 weight percent, fluorine in the form of said fluoroaliphatic radical. $R_f$ is preferably selected from one of the following groups:

$$C_nF_{2n+1}SO_2\overset{\overset{R}{|}}{N}(R^1)$$

$$C_nF_{2n+1}(R^2)$$

wherein n is a positive integer from 3 to 20, preferably, 4 to 10, inclusive,

R represents an alkyl radical having from 1 to 4 carbon atoms, $R^1$ represents an alkylene radical having from 1 to 12 carbon atoms, and $R^2$ represents an alkylene radical having from 1 to 4 carbon atoms.

In the most preferred embodiments of the invention, R is $-CH_3$, $R^1$ is $-CH_2CH_2-$, $-(CH_2)_3$, or $-(CH_2)_4$, and $R^2$ is $-CH_2CH_2-$.

The aliphatic moiety A is a monovalent, non-aromatic, aliphatic radical having from 5 to 36 carbon atoms. The chain in the radical may be straight, branched, or cyclic. The radical preferably contains at least one unsaturated site, and more preferably, two or more unsaturated sites. Compositions of the present invention containing fluorochemical compounds having unsaturated sites are easy to formulate, because the fluorochemical compound readily dissolves in solvents that are not harmful to leather. In addition, when these compositions are applied, the unsaturated fluorochemical compounds begin to cross-link as the solvent evaporates and continue to cross-link even several days after application. In embodiments where A does not contain unsaturated sites, the compositions generally do not cure by cross-linking, but still provide a high degree of water and oil repellancy. The aliphatic moiety A can be a fluoroaliphatic radical, and, in certain embodiments of the invention, A is identical to $R_f$. The aliphatic moiety A can be substituted with one or more pendant hydroxyl groups (—OH) or one or more pendant carboxyl groups (—COOH) or both.

The organic linking group, Q, can have a wide variety of structures, serving as it does the function of bonding together in the same molecule the $R_f$ and A moieties. The Q linkages must be free of moieties, particularly hydrophilic groups, such as acid functional groups and salts thereof, e.g. —COOH and —COONa, polyoxyethylene, polyethyleneimine, and aliphatic hydroxyl groups, which would interfere with the ability of the fluorochemical compound to impart the desires oil and water repellency to the substrate treated therewith in accordance with this invention. Bearing in mind the above-described function of the linking groups and constraints thereon, Q can comprise such representative moieties as aliphatic moieties, e.g. $-CH_2-$, $-CH_2CH_2-$, —CH═CH—, and cyclohexylene, and aromatic moieties, e.g., phenylene, and combinations thereof, e.g. methylene diphenylene and tolylene. It has been found that Q is preferably selected from hetero-atom-containing moieties, such as $$\text{carbonyloxy}\left(-\overset{\overset{O}{\|}}{C}O-\right),\ \text{carbonamido}\left(-\overset{\overset{O}{\|}}{C}NH-\right),$$

$$\text{carbamato}\left(-O\overset{\overset{O}{\|}}{C}NH-\right),\ \text{thiocarbonyl}\left(-\overset{\overset{O}{\|}}{C}S-\right),$$

$$\text{ureylene}\left(-NH\overset{\overset{O}{\|}}{C}NH-\right),$$

and a group represented by the formula $$-O\overset{\overset{O}{\|}}{C}NH-T-NH\overset{\overset{O}{\|}}{C}O-,$$

wherein T represents the residue from a diisocyanate and may be (1) an aliphatic or cycloaliphatic group, for example, the residue of trimethyl-hexamethylene diisocyanate, the residue of methylene bis(4-cyclohexyl isocyanate), or (2) an aromatic group, for example, the residue of toluene diisocyanate. As used herein, the term "residue from a diisocyanate" means the diisocyanate minus the —NCO moieties. However, it should be noted that Q for a specific fluorochemical compound useful in this invention will be dictated by the ease of preparation of such compound and the availability of the necessary precursors thereof.

The products of the present invention can be prepared by any of the following methods:

(1) reacting a fluoroaliphatic sulfonamido alcohol with a fatty acid;

(2) reacting a fluoroaliphatic sulfonamido alcohol with a diisocyanate;

(3) reacting a fluoroaliphatic sulfonamido alcohol with (i) a diisocyanate and (ii) a fatty acid;

(4) reacting a fluoroaliphatic sulfonamido alcohol with (i) a fatty acid, (ii) a diisocyanate, and (iii) a polyhydric alcohol;

(5) reacting a fluroraliphatic alcohol with a fatty acid;

(6) reacting a fluoroaliphatic alcohol with a diisocyanate;

(7) reacting a fluoroaliphatic alcohol with (i) a fatty acid and (ii) a diisocyanate.

(8) reacting a fluoroaliphatic alcohol with (i) a fatty acid, (ii) a diisocyanate, and (iii) a polyhydric alcohol.

Alternatively, in methods (1), (4), (5), the fluoroaliphatic sulfonamido alcohols and the fatty acid can be replaced by a fluoroaliphatic sulfonamido carboxylic acid and a fatty alcohol, respectively; in methods (2), (3), (6), (7), (8) the fluoroaliphatic sulfonamido alcohol can be replaced by a fluoroaliphatic sulfonamido carboxylic acid. Because of the nature of such intermediates and such reactions, the fluorochemicals so prepared and useful in this invention will often be mixtures of isomers and homologs.

The fluoroaliphatic reactants are chemically combined with the aforementioned coreactants through the condensation of their hydroxyl or carboxyl groups with available carboxyl and hydroxyl groups in fatty acids or fatty alcohols to form an ester linkage or bridging radical or through the addition of their hydroxyl or carboxyl groups to an isocyanate group to form a urethane linkage and amide linkage respectively. The reaction of these fluoroaliphatic acids and alcohols with the coreactants is carried out in a manner similar to that conventionally employed with nonfluorinated carboxyl or hydroxyl containing components.

The reactions that do not involve diisocyanates, e.g. (1) and (5), can be conducted by introducing the reactants into a vessel containing a catalyst. Catalysts that are suitable for the reactions include sulfuric acid and ion exchange resins. Commercially available ion exchange resins that are useful as catalysts in the reactions include Amberlite® IR 120, a strongly acidic, sulfonated polystyrene cation exchange resin, and Amberlite® 15, a strongly acid, sulfonic functional cation exchange resin, both of which are available from Mallinckrodt. The reaction medium can include a solvent or it can be solvent free. Solvents suitable for the reaction include xylene and mixtures of hydrocarbons. A commercially available mixture of hydrocarbons useful as a solvent for the reaction medium is Isopar L, available from Exxon. The reaction is preferably conducted under an atmosphere of nitrogen and refluxed until no additional water is generated.

The reactions that involve diisocyanates, e.g. (2), (3), (4), (6), (7), (8), can be conducted by first introducing the reactants into a vessel. The reaction medium can include a solvent or it can be solvent free. Xylene is the preferred solvent. The reaction mixture is then heated to about 70° C., at which temperature a catalyst is added. Catalysts that are suitable for promoting the reaction are tin-containing compounds, such as stannous octoate. When the reaction appears to be complete, as determined by absence of —NCO functionality, isopropanol is added to the reaction mixture to cap off any unreacted —NCO groups. The mixture is then cooled, and the fluorochemical product recovered.

Monofunctional alcohols useful in this invention include the N-alkanol perfluoralkanesulfonamides described in U.S. Pat. No. 2,803,656, which have the general formula $$R_fSO_2N(R)R^1CH_2OH$$

wherein $R_f$ is a perfluoroalkyl group (including perfluorocycloalkyl) having 4 to 10 carbon atoms, $R^1$ is an alkylene radical having 1 to 12 carbon atoms, and R is a hydrogen atom or an alkyl group containing 1 to 4 carbon atoms. These monofunctional alcohols are prepared by reactions of an acetate ester of halohydrin with a sodium or potassium salt of the corresponding perfluoroalkanesulfonamide. Illustrative alcohols include the following:

N-ethyl N-(2-hydroxyethyl) perfluorooctanesulfonamide,
N-propyl N-(2-hydroxyethyl) perfluorooctanesulfonamide,
N-ethyl N-(2-hydroxyethyl) perfluoroethanesulfonamide,
N-ethyl N-(2-hydroxyethyl) perfluorododecanesulfonamide,
N-ethyl N-(2-hydroxyethyl) perfluorcyclohexylethanesulfonamide,
N-propyl N-(2-hydroxyethyl) perfluorobutylcyclohexanesulfonamide,
N-ethyl N-(2-hydroxyethyl) perfluoro-4-dodecylcyclohexanesulfonamide, N-ethyl N-(2-hydroxyethyl) perfluoro-2-methylcyclohexanesulfonamide,
N-ethyl N-(6-hydroxyhexyl) perfluorooctanesulfonamide,
N-methyl N-(11-hydroxyundecyl) perfluorooctanesulfonamide,
N-methyl N-(4-hydroxybutyl) perfluorobutanesulfonamide,
N-(2-hydroxyethyl) perfluorooctanesulfonamide, etc.

Still other useful alcohols include the perfluoroalkyl-substituted alkanols of the formula $C_nF_{2n+1}CH_2OH$, where n is 4 to 10 (e.g., $C_4F_9CH_2OH$), described in U.S. Pat. No. 2,666,797, and of the formula $$R_f\text{-}(CH_2)_m\text{-}OH$$

where $R_f$ is a perfluoroalkyl radical having from 4 to 10 carbon atoms and m is an integer from 1 to 4 (e.g., $C_8F_{17}CH_2CH_2CH_2OH$, $C_3F_7CH_2CH_2CH_2OH$, $C_8F_{17}CH_2CH_2CH_2CH_2OH$, etc.) The perfluoroalkyl-substituted alkenols may also be employed, i.e., $C_nF_{2n+1}(C_mH_{2m-2})OH$ where n is 4 to 10 and m is 1 to 4, e.g., $C_8F_{17}CH{=}CHCH_2OH$. Further useful monofunctional alcohols include the N-[-hydroxypoly(oxaalkylene)]-perfluoroalkane sulfonamides of U.S. Pat. No. 2,915,554, such as $$C_8F_{17}SO_2N(CH_3){-}C_2H_4\text{-}(OCH_2CH_2)_{12}\text{-}OH$$

$$C_8F_{17}SO_2NH(CH_2)_2\text{-}(OCH_2CH_2)_2\text{-}OH$$

$$C_8F_{17}SO_2N(C_2H_5){-}C_2H_4\text{-}(OCH_2CH(CH_3))_{10}\text{-}OH, \text{ etc.}$$

The carboxyl-containing fluoroaliphatic reactants include the monofunctional perfluoroalkanesulfonamidoalkylene-carboxylic acids of U.S. Pat. No. 2,809,990, which have the general formula:

$$R_fSO_2N(R)R^2COOH$$

wherein $R_f$ is a perfluoralkyl (including perfluorocycloalkyl) group having from 4 to 10 carbon atoms, R is hydrogen or an alkyl group having from 1 to 4 carbon atoms and $R^2$ is an alkylene group having from 1 to 12 carbon atoms. Illustrative acids include the following:

N-ethyl N-perfluorooctanesulfonyl glycine,
N-perfluorooctanesulfonyl glycine,
N-perfluoropentanesulfonyl glycine,
N-perfluorodecanesulfonyl glycine,
3-(perfluorooctanesulfonamido) propionic acid,
11-(N-methyl N-perfluorooctanesulfonamido) undecanoic acid,
11-(N-ethyl N-perfluorooctanesulfonamido) undecanoic acid,
N-ethyl N-perfluorocyclohexylsufonyl glycine,
N-ethyl N-perfluorocyclohexylethanesulfonyl glycine,
N-butyl N-perfluoro-4-dodecylcyclohexanesulfonyl glycine,
N-ethyl N-perfluoro-2-methylcyclohexanesulfonyl glycine,
N-hexyl N-perfluorooctanesulfonyl glycine, N-ethyl N-perfluorobutanesulfonyl glycine, etc.

Still other carboxyl containing fluorocarbon reactants include the perfluoro-substituted aliphatic acids, described in U.S. Pat. No. 2,951,051, such as $C_8F_{17}CH_2CH_2CH_2CH_2COOH$ 5-perfluorobutyl pentanoic acid, 11-perfluorooctylhendecanoic acid, etc. as well as the unsaturated perfluoroalkane aliphatic acids, e.g. $R_fCH{=}CH{-}(CH_2)_7CH_2CO_2H$, also described in U.S. Pat. No. 2,951,051.

tative fatty alcohols that are suitable for the practice of this invention are the analogs of the fatty acids mentioned above.

Diisocyanates useful in the practice of this invention can be selected from aromatic, aliphatic, and cycloaliphatic diisocyanates. Representative examples of diisocyanates include trimethyl-hexamethylene diisocyanate, methylenebis(4-cyclohexyl isocyanate), and toluene diisocyanate.

Reactions schemes that can be used for preparing the compounds of the present invention are set forth below:

Scheme 1

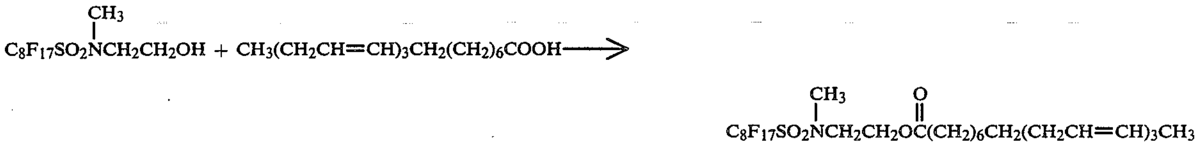

Scheme 2

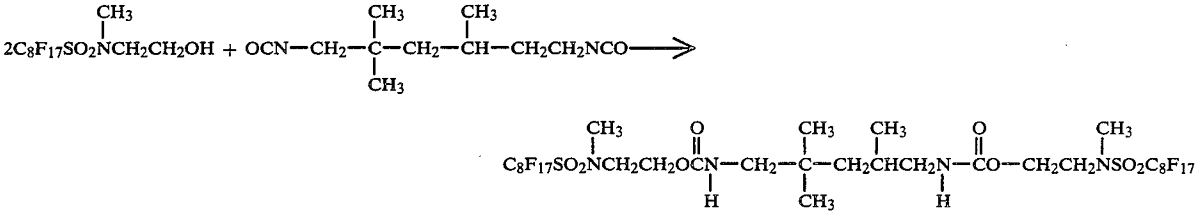

Scheme 3

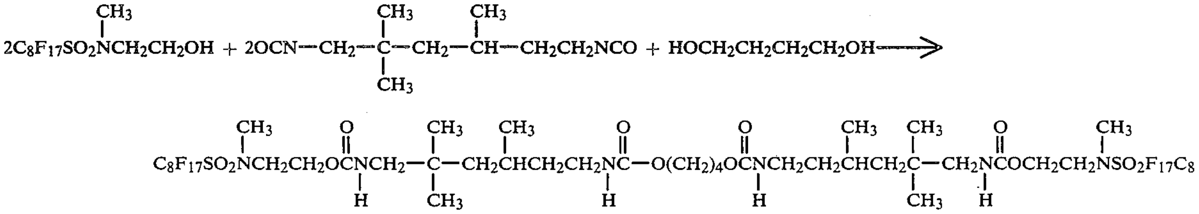

Scheme 4

(4)

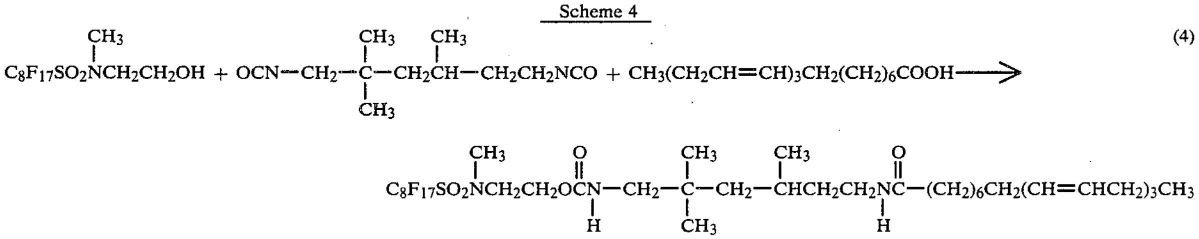

Scheme 5

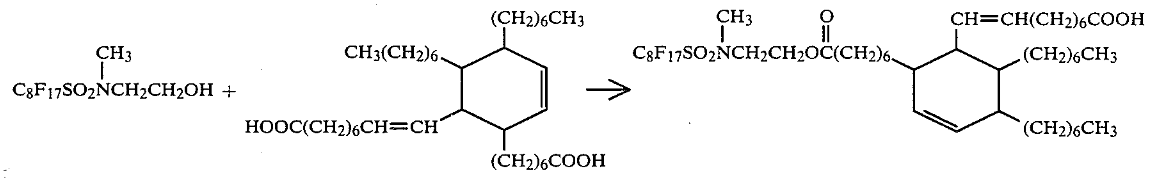

Fatty acid and fatty alcohol reactants useful in the practice of this invention contain from 5 to 36 carbon atoms. It is preferred that the fatty acid or fatty alcohol reactant have at least one to three unsaturated sites, and more if available. Representative examples of fatty acids suitable for the practice of this invention include, but are not limited to, linseed fatty acid, linolenic acid, eleostearic acid, ricinoleic acid, oleic acid, linoleic acid, sorbic acid, dimer acid, and mixtures thereof. Represen- Organic solvents can be used as the vehicle for applying the fluorochemical compounds useful in the practice of this invention. The fluorochemical compounds can be dissolved in an appropriate organic solvent or mixture of organic solvents, and applied directly from the resulting solution. Solvents that are suitable for dissolving the fluorochemicals include chlorinated hydrocarbons, e.g. tetrachlorethane, trichlorethane, isoparaffinic hydrocarbons, alcohols, e.g., isopropyl alcohol, ketones, e.g., methyl isobutyl ketone, and mixtures thereof. Although chlorinated hydrocarbons can be used to dissolve the fluorochemicals, they are not recommended because they can damage leather and dyes that are used on leather. Furthermore, chlorinated hydrocarbons can be objectionable to users of the composition of this invention. The composition can be applied in any of several alternative formulations, including, for example, aerosols, water/oil emulsions, and anhydrous gels. Aerosols will require a propellant, e.g. isobutane. Anhydrous gels will require a gelling agent, e.g. aluminum oleate. Water/oil emulsions will require water and an emulsifying agent, e.g. sorbitan sesquioleate. Water/oil emulsions and anhydrous gels can further employ mild solvents, e.g. isoparaffinic hydrocarbons, which can serve the dual purpose of carrying the fluorochemical and acting as a cleaning aid for the leather. Conditioners and softeners, e.g. mineral oil, can also be included in compositions of the present invention.

The composition of this invention can be used to treat such leather articles as shoe uppers, garments, gloves, luggage, handbags, upholstery, and the like. The composition is particularly useful for leathers having porous surfaces, such as natural smooth leathers having no finish and suede leathers. The composition can also be used with finished skins, e.g. those having a sprayed on leather finish. The composition can also be used to treat textile articles such as clothing, shoes, and the like. The composition is especially useful for articles comprising leather and textiles, e.g. shoes, fashion accessories. In addition, the composition be used to treat cellulosic materials such as wood and paper.

The amount of the fluorochemical deposited on the leather can vary, but functionally stated that amount will be sufficient to impart oil and water repellency to the leather. Generally that amount will be about 0.05 to 1.0 percent by weight, preferably 0.1 to 0.2 percent by weight based on the weight of the leather after it is dried. More can be applied, but a greater effect will probably not be noticed. With such amounts of fluorochemical deposited on the leather, the leather will have oil and water repellency that is durable, that is, the repellency will last a long time during active use of the article made from such finished leather, the fluorochemical penetrating to a significant depth into the leather. Such durable repellency is obtained without adversely affecting the appearance, feel, hand, flexibility, breathability, or other desirable properties of leather. And such desirable properties are obtained not only by treated cattlehide in accordance with this invention but other finished hides and skins, such as sheepskin and pigskin. The amount of fluorochemical required to impart water and oil repellancy to textiles and cellulosic materials is substantially similar to that amount required to impart those properties to leather.

Objects and advantages of this invention are shown in the following examples, Examples 1-11 illustrating the preparation of various fluorochemicals of this invention, Examples 12-13 illustrating the effectiveness of various fluorochemicals in the treatment of leather, and Examples 14-16 illustrating various formulations into which the fluorochemicals can be incorporated.

EXAMPLE 1

In a one-liter, three-necked round-bottomed flask equipped with a reflux condenser and fitted with a Dean-Stark water trap were charged 250 g (0.449 mole) N-methyl (perfluorooctane)sulfonamidoethyl alcohol, 153 g (0.550 mole) linseed fatty acid, 20 g Amberlyst® 15 cation exchange resin, and 150 g xylene solvent. The resulting mixture was stirred and refluxed in an atmosphere of nitrogen at 144° C. for about 16 hours to complete the reaction, as indicated by the water given off as a by-product. The resulting product solution contained the following components in the weight ratio indicated:

$$22\%\ C_8F_{17}SO_2N(CH_3)CH_2CH_2-O\overset{\overset{O}{\|}}{C}(CH_2)_7CH=CH(CH_2)_7CH_3$$

$$16\%\ C_8F_{17}SO_2N(CH_3)CH_2CH_2-O\overset{\overset{O}{\|}}{C}(CH_2)_7CH=CHCH_2CH=CH(CH_2)_4CH_3$$

$$52\%\ C_8F_{17}SO_2N(CH_3)CH_2CH_2-O\overset{\overset{O}{\|}}{C}(CH_2)_7(CH=CHCH_2)_3CH_3$$

$$4\%\ C_8F_{17}SO_2N(CH_3)CH_2CH_2-O\overset{\overset{O}{\|}}{C}(CH_2)_{16}CH_3$$

$$6\%\ C_8F_{17}SO_2N(CH_3)CH_2CH_2-O\overset{\overset{O}{\|}}{C}(CH_2)_{14}CH_3$$

EXAMPLES 2-7

Following the general procedures of Example 1, and using the appropriate or corresponding precursor fluorochemical alcohol and fatty acid, all in the appropriate molar ratios, there were prepared the fluorochemical products represented by the formulas shown in Table I.

TABLE I

| Ex. No. | Fluorochemical | Unsaturated Fatty Acid | Formula of Product |
|---|---|---|---|
| 2 | $C_8F_{17}SO_2N(CH_3)CH_2CH_2OH$ | Eleostearic | $C_8F_{17}SO_2N(CH_3)CH_2CH_2O\overset{\overset{O}{\|}}{C}(CH_2)_7CH=CHCH=CHCH=CH(CH_2)_3CH_3$ |

TABLE I-continued

| Ex. No. | Fluorochemical | Unsaturated Fatty Acid | Formula of Product |
|---|---|---|---|
| 3 | $C_8F_{17}SO_2N(CH_3)CH_2CH_2OH$ | Ricinoleic | $C_8F_{17}SO_2N(CH_3)CH_2CH_2OC(=O)(CH_2)_7CH{=}CHCH_2CH(OH)(CH_2)_5CH_3$ |
| 4 | $C_8F_{17}SO_2N(CH_3)CH_2CH_2OH$ | Oleic | $C_8F_{17}SO_2N(CH_3)CH_2CH_2OC(=O)(CH_2)_7CH{=}CH(CH_2)_7CH_3$ |
| 5 | $C_8F_{17}SO_2N(CH_3)CH_2CH_2OH$ | Linoleic | $C_8F_{17}SO_2N(CH_3)CH_2CH_2OC(=O)(CH_2)_7CH{=}CHCH_2CH{=}CH(CH_2)_4CH_3$ |
| 6 | $C_8F_{17}SO_2N(CH_3)CH_2CH_2OH$ | Sorbic | $C_8F_{17}SO_2N(CH_3)CH_2CH_2OC(=O)CH{=}CHCH{=}CHCH_3$ |
| 7 | $C_8F_{17}SO_2N(CH_3)CH_2CH_2OH$ | Linolenic | $C_8F_{17}SO_2N(CH_3)CH_2CH_2OC(=O)(CH_2)_7(CH{=}CHCH_2)_3CH_3$ |

EXAMPLE 8

Into a 500 ml three-necked round-bottomed flask equipped with a mechanical stirrer, condenser, and thermometer were charged 112 g (0.40 mole) N-methyl perfluorooctanesulfonamidoethyl alcohol, 25 g (0.19 mole) trimethyl hexamethylene diisocyanate, and 120 g xylene. The mixture was heated to 70° C. and stirred for 15 minutes. Stannous octoate (0.05 g) was then added to catalyze the reaction. The resulting mixture was stirred for an additional three hours. At this time, 20 ml of isopropanol was added to cap off any unreacted NCO groups, and an additional 0.05 g stannous octoate was added. The mixture was stirred for an additional hour at 70° C. Then the reaction mixture was allowed to cool to room temperature and stand overnight. The xylene was filtered off and an off-white solid was recovered.

EXAMPLE 9

Into a 250 ml three-necked round-bottomed flask equipped with a mechanical stirrer, condenser, and thermometer were charged 22.3 g (0.040 mole) N-methyl perfluorooctanesulfonamidoethyl alcohol, 10 g (0.048 mole) trimethyl hexamethylene diisocyanate, and 100 g xylene. The mixture was heated to 70° C., 0.05 g stannous octoate added, and the resulting mixture stirred for 1½ hours. Linolenic acid (13.36 g, 0.048 mole) was added to the mixture, and the resulting mixture was stirred overnight at a temperature of 75° C. Additional stannous octoate (0.05 g) was added, and the mixture stirred for two hours at 75° C. Isopropanol (5 ml) was added to cap off any unreacted NCO groups. The reaction mixture was allowed to cool to 30° C. White powder was filtered from the rest of the material. The solvent was stripped and a waxy product was recovered.

EXAMPLE 10

Into a 250 ml three-necked round-bottomed flask equipped with a mechanical stirrer, condenser, and thermometer were charged 22.3 g (0.040 mole) N-methyl perfluorooctanesulfonamidoethyl alcohol, 10 g (0.048 mole) trimethyl hexamethylene diisocyanate, and 100 g xylene. The mixture was heated to 70° C. for 15 minutes, at which time 0.05 g stannous octoate was added. Heating was continued for three hours. 1,4-Butanediol (2.16 g, 0.024 mole) and an additonal 0.05 g stannous octoate were added to the mixture. Heating was continued for an additional 23 hours. Isopropanol (5 ml) was added to the reaction mixture to cap off any unreacted NCO groups, and heating was continued for one hour. The mixture was allowed to cool to room temperature, and the solid was filtered off from xylene.

EXAMPLE 11

Into a two liter three-necked flask equipped with a large magnetic stirring bar and a reflux condenser fitted with a Dean-Stark water collector were charged 145.0 g (0.5 equiv.) of dimer acid (Hystrene® 3695, acid equiv. wt. 290), 139.3 g (0.25 equiv.) of N-methyl perfluorooctanesulfonamidoethyl alcohol and 14.3 g Amberlyst 15® cation exchange resin, and 290 ml xylenes. The reaction mixture was refluxed on a heating mantle with vigorous stirring for two hours, at which time approximately 4.2 ml water was collected.

The mixture was diluted with xylenes, filtered with suction on a Buchner funnel, and the filtrate evaporated on a hot water bath in vacuo using a rotary evaporator. An amber-colored grease (283 g) with a melting range of 51°-55° C. was obtained. The material was very soluble in chloroform and acetone, and isopropanol with warming. A gel formed upon cooling of the isopropanol solution.

EXAMPLE 12

In this example, samples of leather were treated with various fluorochemical compositions in accordance with this invention and the properties of the treated leather tested. For comparison, similar tests were made on untreated samples or on samples treated with products not within the scope of this invention.

In testing the leather samples for water repellancy, a Bally Penetrometer Model 5022 (a dynamic testing machine for shoe leather uppers) was used, in which test the test piece was alternatively buckled and stretched by a machine, like an upper leather in actual use, while in contact with water on one side.

The leather-treating test method was as follows:

(1) Smooth, natural-tanned cowhide was first cut to form a pad having the dimensions 2⅜ in by 2⅞ in.
(2) The pad was then weighed.
(3) The treating composition was then applied to the face side of the pad and worked into the leather thoroughly.
(4) The treated pad was allowed to dry in air for at least 24 hours.

(5) The treated pad was weighed to determine the coating weight.

(6) The treated pads were then evaluated with the Bally Penetrometer.

The quantities measured were:

(a) The time until water first penetrates from one side of the test piece to the other.

(b) The weight increase, in percent of the test piece weight, caused by water absorption during predetermined time intervals.

The results of the treatments are shown in Table II.

TABLE II

| Treating agent | Penetration time (min) | Water absorption (percent) |
|---|---|---|
| Product of Example 1 | 15 | 3.5 |
| Product of Example 2 | 15 | 11.3 |
| Product of Example 3 | 15 | 13.7 |
| Product of Example 4 | 15 | 15.4 |
| Product of Example 5 | 15 | 14.7 |
| Product of Example 6 | 15 | 10.4 |
| Product of Example 7 | 15 | 3.7 |
| Product of Example 8 | 10 | 8.6 |
| Product of Example 9 | 10 | 1.3 |
| Product of Example 10 | 10 | 3.5 |
| Product of Example 11 | 14 | 5.1 |
| $C_8F_{17}SO_2N(CH_3)CH_2CH_2OH$ | 15 | 98.05 |
| Stearic acid + $C_8F_{17}SO_2N(CH_3)CH_2CH_2OH$ | 15 | 41.1 |
| Wax S (Technical montanic acid) + $C_8F_{17}SO_2N(CH_3)CH_2CH_2OH$ | 15 | 31.3 |

From the foregoing Table, it is apparent that the products of Examples 1–11 impart to leather a high degree of resistance to water. These products were formed from the reaction of a fluorochemical alcohol with unsaturated fatty acids, isocyanates, or a combination of both. N-methyl perfluorooctanesulfonamidoethyl alcohol, by itself, provided no enhanced water resistance. The reaction product of saturated aliphatic acids, e.g., stearic acid, Wax S, with N-methyl perfluorooctanesulfonamidoethyl alcohol provided a lower degree of water resistance than did the products of this invention.

EXAMPLE 13

This example compares the efficacy of the product of the present invention with commercially available water-repellants for leather. The following ingredients, in the amounts indicated, were mixed in a beaker to form a gel-type leather treating composition:

| Ingredient | Amount (% by weight) |
|---|---|
| Product of Example 1 | 5.0 |
| Aluminum stearate | 1.5 |
| Aluminum soap (Alumagel ®, available from Witco Chemical Co.) | 2.5 |
| Isoparaffinic hydrocarbon (Isopar L, available from Exxon) | 76.0 |
| Mineral oil | 15.0 |

This treating agent, referred to as Formulation A, was compared with the commercially available leather treating agents listed in Table III. The leather-treating test method was the same as that employed in Example 12, and the results of the treatment comparison is shown in Table III.

TABLE III

| Treating Agent | Buckling time (min) | Water absorption (Percent) |
|---|---|---|
| Formulation A | 10 | 5.3 |
| Biwell ® - a formulation comprising carnauba wax, lanolin, fish oil, and denatured alcohol | 10 | 41.1 |
| Kiwi ® - a formulation comprising a silicone compound and petroleum distillates | 10 | 68.8 |
| Ultra-seal ® - a formulation comprising a silicone compound in a petroleum solvent | 10 | 96.9 |
| Mink oil - a formulation comprising pure mink oil, extra fancy beef tallow, and zinc stearate | 10 | 98.3 |
| Sno-seal ® - a formulation comprising beeswax, but containing no lanolin or oils | 10 | 107.2 |
| Control (no treatment) | 10 | 97.6 |

From the foregoing Table, it is apparent that the product of the present invention is much better than commercially available products with respect to water repellancy.

EXAMPLE 14

This Example describes a leather treatment composition that can be applied as a clear liquid. The following ingredients in the amounts indicated were introduced into a beaker:

| Ingredient | Amount (parts by weight) |
|---|---|
| Product of Example 1 | 5 |
| Mineral oil | 15 |
| Isopropyl alcohol | 5 |
| Isoparaffinic hydrocarbon (Isopar L) 75 | |

EXAMPLE 15

This Example describes a leather treatment composition that can be applied as an aerosol foam. The following ingredients in the amounts indicated were introduced into a container suitable for aerosol compositions:

| Ingredient | Amount (parts by weight) |
|---|---|
| Product of Example 1 | 5 |
| Mineral oil | 15 |
| Isopropyl alcohol | 3 |
| Aluminum soap (Alumagel ®) | 3.5 |
| Non-ionic fluorochemical surfactant (fluoroaliphatic polymeric ester, FC-740, Minnesota Mining and Manufacturing Company) | 0.5 |
| Isoparaffic hydrocarbon (Isopar L) | 73 |
| Isobutane | 11.2 |

EXAMPLE 16

This Example describes a leather treatment composition that can be applied as an aerosol spray. The following ingredients in the amounts indicated were introduced into a container suitable for aerosol compositions:

| Ingredient | Amount (parts by weight) |
|---|---|
| Product of Example 1 | 5 |
| Mineral oil | 15 |
| Isopropyl alcohol | 6 |
| Isoparaffinic hydrocarbon (Isopar L) | 74 |
| Isobutane | 11.2 |

EXAMPLE 17

This Example describes a leather treatment composition that can be applied as a water/oil emulsion. The following ingredients in the amounts indicated were introduced into a beaker:

| Ingredient | Amount (parts by weight) |
|---|---|
| Product of Example I | 4 |
| Mineral Oil | 4 |
| Isoparaffinic hydrocarbon (Isopar L) | 26 |
| Styrene isoprene elastomeric gelling agent (5% Kraton ® 1107, available from Shell, in Isopar L) | 20 |
| Sorbitan sesquioleate emulsifying agent (Arlacel ® 83, ICI Americas, Inc.) | 1 |
| Propylene glycol | 3 |
| Water | 42 |

EXAMPLE 18

In this example, samples of textiles were treated with the following composition in accordance with this invention and properties of the treated textiles tested.

| Ingredient | Amount (% by weight) |
|---|---|
| Product of Example 1 | 15.0 |
| Isoparaffinic hydrocarbon (Isopar L) | 69.0 |
| Isopropyl alcohol | 5.0 |
| Zirconium salt of mixed aliphatic acids (Troymax Zirconium 18, Troy Chemical Corporation, Inc., Newark, N.J.) | 0.048 |
| Manganese salt of mixed aliphatic acids (Troymax Manganese 12, Troy Chemical Corporation, Inc., Newark, N.J.) | 0.077 |
| 1,10 Phenanthroline (Activ-8 ®, R. T. Vanderbilt Company, Inc., Norwalk, CT.) | 0.037 |
| Propane | 10.8 |

In testing the textile samples for water repellancy, a spray test (AATCC-22-1967) was employed. This test was conducted as follows:

(1) The test specimen (17.8×17.8 cm), conditioned at 65±2% relative humidity and 21±1° C. for a minimum of four hours before testing, was fastened in a 15.2 cm metal hoop to present a smooth wrinkle-free surface.

(2) The hoop was then placed on the stand of the AATCC. Spray Tester.

(3) Two hundred fifty ml of distilled water at 27±1° C. was poured into the funnel of the tester and allowed to spray onto the test specimen, which took 25–30 seconds.

(4) Upon completion of the spraying period, the hoop was taken by one edge and the opposite edge tapped against a solid object, then rotated 180° and tapped once more on the point previously held.

(5) After tapping, the wet or spotted pattern was compared with a standard rating chart.

The results of the treatment and the rating scale are shown in Table IV.

TABLE IV

| Test fabric | Rating[1] Untreated | Rating[1] Treated |
|---|---|---|
| Cotton | 0 | 80 |
| Silk | 0 | 80 |
| Wool | 80 | 80 |
| Chlorinated wool | 0 | 80 |
| Nylon | 0 | 70 |
| Polyester | 0 | 80 |
| Acrylic | 0 | 80 |

[1]100 = No sticking or wetting of upper surface
90 = Slight random sticking or wetting of upper surface
80 = Wetting of upper surface at spray points
70 = Partial wetting of whole of upper surface
50 = Complete wetting of whole of upper surface
0 = Complete wetting of whole of upper and lower surfaces.

From the foregoing Table, it is apparent that the product of Example 1 imparts to various textiles a high degree of resistance to water.

EXAMPLE 19

In this example, wooden tongue depressors were treated with the following compositions in accordance with this invention and properties of the treated articles tested.

COMPOSITION A

| Ingredient | Amount (% by weight) |
|---|---|
| Product of Example 1 | 14.8 |
| Isoparaffinic hydrocarbon (Isopar L) | 64.1 |
| Mineral oil | 6.2 |
| Isopropyl alcohol | 3.5 |
| Zirconium salt of mixed aliphatic acids (Troymax Zirconium 18) | 0.048 |
| Manganese salt of mixed aliphatic acids (Troymax Manganese 12) | 0.077 |
| 1,10 Phenanthroline (Activ-8 ®) | 0.037 |
| Propane | 11.2 |

COMPOSITION B

| Ingredient | Amount (% by weight) |
|---|---|
| Product of Example 1 | 15.0 |
| Isoparaffinic hydrocarbon (Isopar L) | 69.0 |
| Isopropyl alcohol | 5.0 |
| Zirconium salt of mixed aliphatic acids (Troymax Zirconium 18) | 0.048 |
| Manganese salt of mixed aliphatic acids (Troymax Manganese 12) | 0.077 |
| 1,10 Phenanthroline (Activ-8 ®) | 0.037 |

-continued

| COMPOSITION B | |
| --- | --- |
| Ingredient | Amount (% by weight) |
| Propane | 10.8 |

The effectiveness of these compositions for water repellancy was tested by measuring the weight percentage of water absorbed by the untreated and treated tongue depressors.

The tongue depressors were immersed in a water bath having a temperature of 60° F. for 45 minutes. Upon removal, the excess water was removed by shaking. The percentage of water absorbed was determined by weighing the tongue depressors before and after immersion, and multiplying the difference divided by original weight by 100.

The results are shown in Table V.

TABLE V

| Untreated | | |
| --- | --- | --- |
| Initial weight (g) | Weight increase (g) | Percent water absorbed |
| 3.163 | 1.272 | 40.2 |
| 3.220 | 1.401 | 43.5 |
| 3.329 | 1.367 | 41.1 |
| 3.142 | 1.115 | 35.5 |

| Treated with Composition A | | | |
| --- | --- | --- | --- |
| Initial weight (g) | Coating weight (g) | Weight increase (g) | Percent water absorbed |
| 3.285 | 0.123 | 0.487 | 14.3 |
| 3.158 | 0.200 | 0.475 | 14.1 |
| 3.227 | 0.113 | 0.530 | 15.7 |
| 3.269 | 0.181 | 0.463 | 13.4 |

| Treated with Composition B | | | |
| --- | --- | --- | --- |
| Initial weight (g) | Coating weight (g) | Weight increase (g) | Percent water absorbed |
| 3.063 | 0.055 | 0.547 | 17.5 |
| 3.205 | 0.053 | 0.572 | 17.5 |
| 3.007 | 0.080 | 0.580 | 18.8 |
| 3.077 | 0.095 | 0.625 | 19.7 |

From the foregoing Table, it can be seen that the product of Example I imparts a high level of water repellancy to wood.

Various modifications and alterations of this invention will be apparent to those skilled in the art without departing from the scope and spirit of this invention.

What is claimed is:

1. Method of treating a material selected from the group consisting of leather, textiles, and cellulosics in order to provide enhanced water and oil repellancy thereto comprising the step of applying to said material a composition comprising a compound represented by the formula:

$$R_f-Q-A$$

wherein $R_f$ represents a member selected from the group consisting of $$C_nF_{2n+1}SO_2\overset{R}{\overset{|}{N}}(R^1) \text{ and } C_nF_{2n+1}(R^2)$$

n represents a positive integer from 3 to 20, inclusive,

R represents an alkyl radical having 1 to 4 carbon atoms, $R^1$ represents an alkylene radical having 1 to 12 carbon atoms, $R^2$ represents an alkylene radical having 1 to 4 carbon atoms, A represents a hydrocarbon group having from 5 to 36 carbon atoms, said hydrocarbon group having at least one unsaturated site, said hydrocarbon group optionally being substituted with a hydroxyl group or a carboxyl group, Q represents a member selected from the group consisting of $$-\overset{O}{\overset{\|}{C}}O-,\ -\overset{O}{\overset{\|}{C}}NH-,\ -O\overset{O}{\overset{\|}{C}}NH,\ -\overset{O}{\overset{\|}{C}}S-,$$

$$-NH\overset{O}{\overset{\|}{C}}NH-,\ -O\overset{O}{\overset{\|}{C}}NH-T-NH\overset{O}{\overset{\|}{C}}O-$$

wherein T represents an aliphatic group, a cycloaliphatic group, or an aromatic group.

2. The method of claim 1 wherein the composition further includes at least one organic solvent as a vehicle for said compound.

3. The method of claim 2 wherein the composition further includes a propellant.

4. The method of claim 2 wherein the composition further includes a gelling agent.

5. The method of claim 4 wherein the composition further includes water.

6. The method of claim 5 wherein the composition further includes an emulsifying agent.

7. The method of claim 1 wherein the material being treated is leather.

8. Article made from a material selected from the group consisting of leather, textiles, cellulosics, and combination thereof bearing a coating applied by the method of claim 1.

9. Composition for treating leather, textiles, and cellulosic materials in order to provide enhanced water and oil repellancy thereto, said composition comprising:

(a) a compound represented by the formula $$R_f-Q-A$$

wherein $R_f$ represents a member selected from the group consisting of $$C_nF_{2n+1}SO_2\overset{R}{\overset{|}{N}}(R^1) \text{ and } C_nF_{2n+1}(R^2)$$

n represents a positive integer from 3 to 20, inclusive,

R represents an alkylene radical having 1 to 4 carbon atoms, $R^1$ represents an alkylene radical having 1 to 12 carbon atoms, $R^2$ represents an alkylene radical having 1 to 4 carbon atoms;

A represents a hydrocarbon group having from 5 to 36 carbon atoms, said hydrocarbon group having at least one unsaturated site, said hydrocarbon group optionally being substituted with a hydroxyl group or a carboxyl group;

Q represents a member selected from the group consisting of $$-\overset{O}{\overset{\|}{C}}O-,\ -\overset{O}{\overset{\|}{C}}NH-,\ -O\overset{O}{\overset{\|}{C}}NH,\ -\overset{O}{\overset{\|}{C}}S-,$$

$$-NH\overset{O}{\overset{\|}{C}}NH-,\ -O\overset{O}{\overset{\|}{C}}NH-T-NH\overset{O}{\overset{\|}{C}}O-$$

wherein T represents an aliphatic group, a cycloaliphatic group, or an aromatic group; and (b) a vehicle that is not deleterious to said leather, dyes that have been applied to said leather, said textiles, or said cellulosic materials.

10. The composition of claim 9 wherein said vehicle comprises at least one organic solvent for said compound.

11. The composition of claim 10 wherein said vehicle further comprises a propellant.

12. The composition of claim 10 wherein said vehicle further comprises a gelling agent.

13. The composition of claim 12 further including water.

14. The composition of claim 13 further including an emulsifying agent.

* * * * *

UNITED STATES PATENT AND TRADEMARK OFFICE

CERTIFICATE OF CORRECTION

PATENT NO. : 4,539,006

DATED : September 3, 1985

INVENTOR(S) : Nathaniel P. Langford

It is certified that error appears in the above-identified patent and that said Letters Patent is hereby corrected as shown below:

Column 3, line 60: "desires" should read --desired--.

Column 14, line 39: "75" should be moved under the heading "Amount".

Claim 9, Column 18, line 58: "R represents an alkylene" should read --R represents an alkyl--.

Signed and Sealed this

*Seventeenth* Day of *December 1985*

[SEAL]

*Attest:*

DONALD J. QUIGG

*Attesting Officer*

*Commissioner of Patents and Trademarks*